(12) United States Patent
Yogo et al.

(10) Patent No.: US 11,374,263 B2
(45) Date of Patent: Jun. 28, 2022

(54) NONAQUEOUS ELECTROLYTE SECONDARY BATTERY

(71) Applicant: SANYO Electric Co., Ltd., Daito (JP)

(72) Inventors: Junichi Yogo, Hyogo (JP); Masashi Muraoka, Hyogo (JP); Keisuke Minami, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 345 days.

(21) Appl. No.: 16/582,356

(22) Filed: Sep. 25, 2019

(65) Prior Publication Data

US 2020/0106136 A1    Apr. 2, 2020

(30) Foreign Application Priority Data

Sep. 28, 2018  (JP) .............................. JP2018-185113

(51) Int. Cl.
*H01M 10/0587* (2010.01)
*H01M 4/13* (2010.01)
*H01M 4/36* (2006.01)
*H01M 10/0525* (2010.01)
*H01M 50/463* (2021.01)

(52) U.S. Cl.
CPC ......... *H01M 10/0587* (2013.01); *H01M 4/13* (2013.01); *H01M 4/364* (2013.01); *H01M 10/0525* (2013.01); *H01M 50/463* (2021.01)

(58) Field of Classification Search
CPC ....... H01M 10/00587; H01M 10/0525; H01M 50/463; H01M 4/13; H01M 4/364; H01M 10/0587
See application file for complete search history.

(56) References Cited

U.S. PATENT DOCUMENTS

2015/0325885 A1* 11/2015 Nansaka ................ H01G 11/26
                                                           429/94

FOREIGN PATENT DOCUMENTS

| JP | 2005-310617 A | 11/2005 |
| JP | 2006-278182 A | 10/2006 |
| JP | 2009252349    | * 10/2009 |
| JP | 5365215 B2    | 12/2013 |
| JP | 2016-81605 A  | 5/2016 |

* cited by examiner

*Primary Examiner* — Jayne L Mershon
(74) *Attorney, Agent, or Firm* — WHDA, LLP

(57) ABSTRACT

A nonaqueous electrolyte secondary battery according to an embodiment of the present disclosure includes a negative electrode mixture layer which contains a first region located in a flat part of an electrode body and second regions located in a pair of curved parts of the electrode body, the ratio (B/A) of the packing density (B) in each of the second regions to the packing density (A) in the first region being 0.75 or more and 0.95 or less. Further, in a section passing through the center in the axial direction of the electrode body and being perpendicular to the axial direction, the ratio (SB/SA) of the sectional area (SB) of the pair of curved parts to the sectional area (SA) of the flat part is 0.28 or more and 0.32 or less.

6 Claims, 2 Drawing Sheets

NONAQUEOUS ELECTROLYTE SECONDARY BATTERY

CROSS REFERENCE TO RELATED APPLICATIONS

The present invention application claims priority to Japanese Patent Application No. 2018-185113 filed in the Japan Patent Office on Sep. 28, 2018, the entire contents of which are incorporated herein by reference.

BACKGROUND OF THE INVENTION

Field of the Invention

The present disclosure relates to a nonaqueous electrolyte secondary battery.

Description of Related Art

A nonaqueous electrolyte secondary battery has been known, which includes a wound electrode body obtained by winding a positive electrode and a negative electrode through a separator and formed into a flat shape having a flat part and a pair of curved parts. Japanese Published Unexamined Patent Application No. 2006-278182 (Patent Document 1) discloses a nonaqueous electrolyte secondary battery including a negative electrode in which the packing density of a negative electrode mixture layer in a curved part of an electrode body is lower than that in a flat part for the purpose of suppressing the distortion of an electrode plate associated with charge/discharge of the battery.

Also, Patent Document 1 describes that a difference in packing density between the flat part and the curved part is preferably within 5%.

BRIEF SUMMARY OF THE INVENTION

A nonaqueous electrolyte secondary battery including a flat-shape wound electrode body having a flat part and a curved part has the problem that when the electrode body is expanded associated with charge/discharge, the nonaqueous electrolyte impregnated into the electrode body is pushed out from the electrode body, and the amount of the electrolyte is greatly decreased, thereby decreasing cycle characteristics. In particular, the amount of the electrolyte in the flat part is easily decreased due to a large change in volume of the flat part associated with charge/discharge, and thus the electrolyte necessary for battery reaction may be insufficient or so-called liquid shortage may occur due to depletion of the electrolyte. Related art containing the technique disclosed in Patent Document 1 still has a room for improvement in suppression of a decrease in cycle characteristics due to a decrease in amount of the electrolyte impregnated into the flat part of the electrode body.

A nonaqueous electrolyte secondary battery according to an aspect of the present disclosure includes a wound electrode body which is obtained by winding a positive electrode, containing a positive electrode mixture layer, and a negative electrode containing a negative electrode mixture layer, through a separator and which is formed into a flat shape having a flat part and a pair of curved parts, a nonaqueous electrolyte, and a battery case which houses the electrode body and the nonaqueous electrolyte. The negative electrode mixture layer contains a first region located in the flat part of the electrode body and second regions located in the pair of curved parts. The ratio (B/A) of packing density (B) in each of the second regions to the packing density (A) in the first region is 0.75 or more and 0.95 or less, and in a section passing through the center in the axial direction of the electrode body and being perpendicular to the axial direction, the ratio (SB/SA) of the sectional area (SB) of the pair of curved parts to the sectional area (SA) of the flat part is 0.28 or more and 0.32 or less.

According to an embodiment of the present disclosure, it is possible to improve the cycle characteristics of a nonaqueous electrolyte secondary battery including a flat-shape wound electrode body having a flat part and a curved part. A nonaqueous electrolyte secondary battery according to the present disclosure has a high capacity retention rate and output after a cycle test and has little precipitation of lithium on the surface of a negative electrode.

DETAILED DESCRIPTION OF THE INVENTION

According to an embodiment of the present disclosure, as described above, it is possible to improve the cycle characteristics of a nonaqueous electrolyte secondary battery including a flat-shape wound electrode body having a flat part and a curved part. In a nonaqueous electrolyte secondary battery according to the present disclosure, when an electrode body is expanded due to the expansion of a negative electrode during charge, the nonaqueous electrolyte pushed out from a flat part of the electrode body is effectively stocked in a curved part. In addition, when the volume of the flat part is contracted, the nonaqueous electrolyte stocked in the curved part is returned to the flat part, and thus the lack of the electrolyte in the flat part is suppressed. Therefore, the nonaqueous electrolyte secondary battery according to the present disclosure is considered to suppress a decrease in cycle characteristics due to a decrease in the amount of the electrolyte impregnated into the flat part of the electrode body.

An example according to an embodiment of the present disclosure is described in detail below. In the embodiment, a prismatic battery including a battery case 200, which is a prismatic metal-made case, is described as an example. However, the battery case is not limited to a prismatic shape and may be, for example, a battery case composed of a laminate sheet containing a metal layer and a resin layer. In the specification of the present disclosure, the description "substantially", for example, "substantially the same", represents both states recognized as completely the same and recognized as substantially the same.

Figure 1:
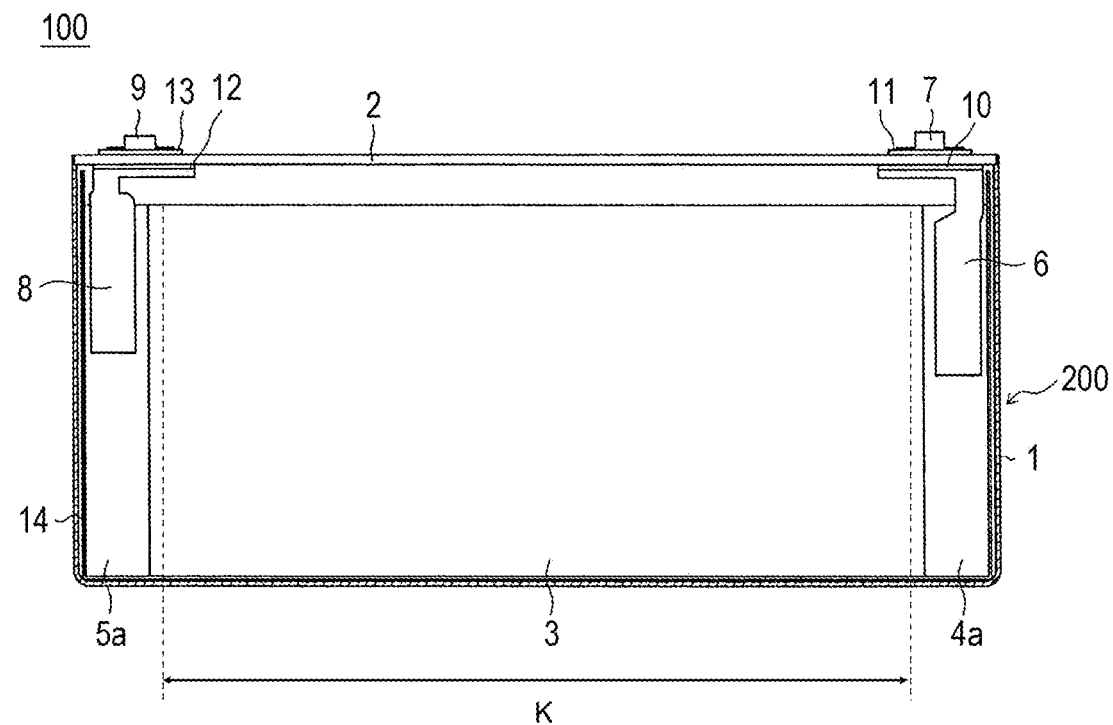
FIG. 1 is a front view of an example of a nonaqueous electrolyte secondary battery according to an embodiment of the present disclosure with the front parts of a battery case and of an insulating sheet being removed.
Figure 2:
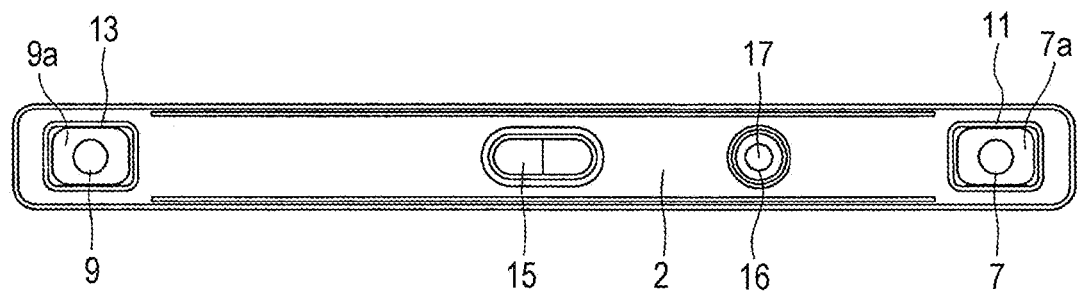
FIG. 2 is a plan view of an example of a nonaqueous electrolyte secondary battery according to an embodiment of the present disclosure.

As shown by an example in FIG. 1 and FIG. 2, a nonaqueous electrolyte secondary battery 100 includes a wound electrode body 3 which is obtained by winding a positive electrode and a negative electrode through a separator and which is formed into a flat shape having a flat part and a pair of curved parts, a nonaqueous electrolyte, and a battery case 200 which houses the electrode body 3 and the nonaqueous electrolyte. The battery case 200 includes a prismatic outer case 1 having a bottomed cylindrical shape having an opening and a sealing plate 2 which seals the opening of the prismatic outer case 1. Each of the prismatic outer case 1 and the sealing plate 2 is made of a metal and is preferably made of aluminum or an aluminum alloy.

The prismatic outer case 1 has a bottom part having a substantially rectangular bottom surface and a side wall part erected on the periphery of the bottom part. The side wall part is formed perpendicularly to the bottom part. The dimensions of the prismatic outer case 1 are not particularly limited but are, for example, 130 mm or more and 160 mm or less in length in the lateral direction, 60 mm or more and 70 mm or less in height, and 15 mm or more and 18 mm or less in thickness. In the specification of the present disclosure, for the sake of description, the direction along the longitudinal direction of the bottom part of the prismatic outer case 1 is referred to as the "lateral direction" of the outer case, the direction in which the side wall extends perpendicularly to the bottom part is referred to as the "height direction", and the direction perpendicular to the lateral direction and the height direction is referred to as the "thickness direction".

The nonaqueous electrolyte contains a nonaqueous solvent and an electrolyte salt dissolved in the nonaqueous solvent. Examples of the nonaqueous solvent include esters, ethers, nitriles, amides, mixed solvents of two or more of these solvents, and the like. The nonaqueous solvent may contain a halogen-substituted compound produced by at least partially substituting hydrogen of the solvent with a halogen atom such as fluorine or the like. For example, a lithium salt such as $LiPF_6$ or the like is used as the electrolyte salt. The battery case 200 (prismatic outer case 1) may house the nonaqueous electrolyte in an amount of 55 g or more and 75 g or less. In particular, in the case of the prismatic outer case 1 having the dimensions described above, the amount of the nonaqueous electrolyte is preferably 55 g or more and 75 g or less.

The positive electrode is a long body having a positive electrode core made of a metal and positive electrode mixture layers formed on both surfaces of the core, and a strip-shaped core exposed portion 4a, in which the positive electrode core is exposed, is formed at one of the ends in the lateral direction to extend along the longitudinal direction. Similarly, the negative electrode is a long body having a negative electrode core made of a metal and negative electrode mixture layers formed on both surfaces of the core, and a strip-shaped core exposed portion 5a, in which the negative electrode core is exposed, is formed at one of the ends in the lateral direction to extend along the longitudinal direction. The electrode body 3 has a structure in which the positive electrode and the negative electrode are wound through the separator so that the positive electrode core exposed portion 4a and the negative electrode core exposed portion 5a are disposed on the respective both sides in the axial direction.

A positive electrode current collector 6 and a negative electrode current collector 8 are connected to the laminated portions of the positive electrode core exposed portion 4a and the negative electrode core exposed portion 5a, respectively. The positive electrode current collector 6 is preferably made of aluminum or an aluminum alloy. The negative electrode current collector 8 is preferably made of copper or a copper alloy. A positive electrode terminal 7 has a flange part 7a provided outside the battery to be disposed on the sealing plate 2 and an insertion part inserted into a through hole provided in the sealing plate 2, and is electrically connected to the positive electrode current collector 6. A negative electrode terminal 9 has a flange part 9a provided outside the battery to be disposed on the sealing plate 2 and an insertion part inserted into a through hole provided in the sealing plate 2, and is electrically connected to the negative electrode current collector 8.

The positive electrode current collector 6 and the positive electrode terminal 7 are fixed to the sealing plate 2 through an inner insulating member 10 and an outer insulating member 11, respectively. The inner insulating member 10 is disposed between the sealing plate 2 and the positive electrode current collector 6, and the outer insulating member 11 is disposed between the sealing plate 2 and the positive electrode terminal 7. Similarly, the negative electrode current collector 8 and the negative electrode terminal 9 are fixed to the sealing plate 2 through an inner insulating member 12 and an outer insulating member 13, respectively. The inner insulating member 12 is disposed between the sealing plate 2 and the negative electrode current collector 8, and the outer insulating member 13 is disposed between the sealing plate 2 and the negative electrode terminal 9.

The electrode body 3 is housed in a state of being covered with an insulating sheet 14 inside the prismatic outer case 1. The sealing plate 2 is connected by laser welding or the like to the edge part of the opening of the prismatic outer case 1. The sealing plate 2 has an electrolyte injection hole 16 which is sealed with a sealing plug 17 after injecting the nonaqueous electrolyte into the battery case 200. The sealing plate 2 has a gas discharge valve 15 which discharges gas when the pressure in the battery is a predetermined value or more.

Figure 3:
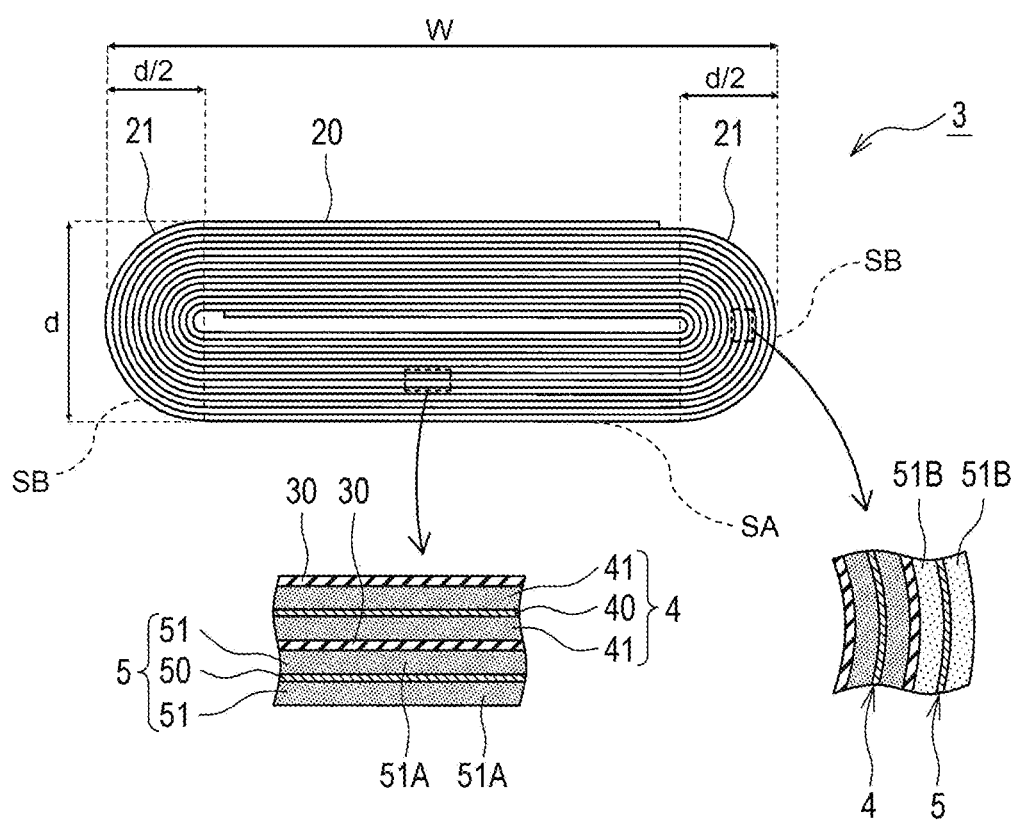
FIG. 3 is a sectional view of an example of an electrode body according to an embodiment of the present disclosure.

The electrode body 3, particularly, the negative electrode 5 and the separator 30 constituting the electrode body 3, are described in detail below with reference to FIG. 3. FIG. 3 shows a cross-section (may be referred to as a "section X" hereinafter) passing through the center in the axial direction of the electrode body 3 and being perpendicular to the axial direction.

As shown by an example in FIG. 3, the electrode body 3 is a wound electrode body formed by winding the positive electrode 4 and the negative electrode 5 through the separator 30 and is formed into a flat shape having a flat part 20 and a pair of curved parts 21. In the specification of the present disclosure, for the sake of description, the direction in which the flat part 20 and the pair of curved parts 21 are arranged is referred to as the "width direction" of the electrode body 3, and the direction perpendicular to the axial direction and the width direction is referred to as the "thickness direction". In an embodiment of the present disclosure, the electrode body 3 is housed in the prismatic outer case 1 so that the axial direction of the electrode body 3 is along the lateral direction of the prismatic outer case 1, and the width direction of the electrode body 3 is along the height direction of the prismatic outer case 1.

The flat part 20 is a part disposed in substantially parallel along the width direction without curvature of the electrode plate (the positive electrode 4 and the negative electrode 5). The pair of curved parts 21 are parts in each of which the electrode plate is curved in an arc shape, and the electrode plate is curved to project outward in the width direction. The pair of curved parts 21 are formed on both sides in the width direction of the electrode body 3 so as to hold the flat part 20 therebetween. In a sectional view (section X), the flat part 20 has a substantially rectangular shape, and each of the curved parts 21 has a substantially semicircular shape. The radii of the curved parts 21 are, for example, substantially equal to each other, and the value of two times the radius of each of the curved parts 21 is equal to the thickness (d) of the flat part 20 (that is, the radius of each of the curved parts 21 is d/2).

As described above, in the electrode body 3, the core exposed portion 4a of the positive electrode 4 and the core exposed portion 5a of the negative electrode 5 are disposed on the respective both sides in the axial direction. In addition, the entire regions of the positive electrode mixture layers 41 face the respective negative electrode mixture layers 51 through the separator 30. Although described in detail later, the electrode body 3 is produced by forming a wound body, which is obtained by cylindrically winding the positive electrode 4 and the negative electrode 5 through the separator 30, into a flat shape by pressing under predetermined pressure in the radial direction.

The electrode body 3 includes, for example, two long separators 30 disposed to hold the positive electrode 4 therebetween in the order of separator 30/positive electrode 4/separator 30/negative electrode 5 from the inside of the winding of the electrode body 3. In this case, the length of each of the separators 30 is preferably longer than at least the length of the positive electrode 4. The width of each of the separators 30 is shorter than the length (L) in the axial direction of the electrode body 3 and is longer than at least the width of the positive electrode mixture layers 41 (the length (K) of the positive electrode mixture layers 41 along the axial direction of the electrode body 3). The width of each of the separators 30 may be longer than the width of the negative electrode mixture layers 51.

In the section X of the electrode body 3, the ratio (SB/SA) of the cross-sectional area (SB) of each of the pair of curved parts 21 to the cross-sectional area (SA) of the flat part 20 is 0.28 or more and 0.32 or less. With the cross-sectional area ratio (SB/SA) of less than 0.28, the function of stocking the nonaqueous electrolyte in the curved parts 21 is not satisfactorily exhibited, and the cycle characteristics of the battery are decreased. On the other hand, with the cross-sectional area ratio (SB/SA) exceeding 0.32, the output characteristics of the battery are decreased. The cross-sectional area ratio (SB/SA) is particularly preferably 0.29 or more and 0.31 or less.

The thickness (d) and the width (W) at the center in the axial direction of the electrode body 3 are measured, and the sectional areas (SA and SB) are calculated by formulae below wherein d/2 represents the radius of the curved parts 21.

$$SA = d \times (W-d)$$

$$SB = ((d/2) \times (d/2)) \times \pi$$

In addition, the cross-sectional areas (SA and SB) can also be measured by image analysis of the section X.

The ratio (K/W) of the length (K) of the positive electrode mixture layers 41 along the axial direction of the electrode body 3 to the length (W) in the width direction of the electrode body 3 (i.e., the width (W) at the center in the axial direction of the electrode body 3) is preferably 1.6 or more. The length in the width direction represents the length in the direction perpendicular to the axial direction and the thickness direction of the electrode body 3. The ratio (K/W) may be referred to as the "aspect ratio" hereinafter. With the aspect ratio (K/W) of 1.6 or more, the electrolyte becomes difficult to push out from both ends in the longitudinal direction of the flat part 20 (both ends in the axial direction of the electrode body 3), and the electrolyte becomes easy to push out to the curved parts 21 from both ends in the width direction of the flat part 20 during charge, thereby easily exhibiting the function of stocking the nonaqueous electrolyte in the curved parts 21. The upper limit of the aspect ratio (K/W) is not particularly limited but is preferably 3.0 or less.

[Positive Electrode]

As described above, the positive electrode 4 includes the positive electrode core 40 and the positive electrode mixture layers 41 formed on both surfaces of the positive electrode core 40. The positive electrode core 40 can be formed by using a metal foil of aluminum, an aluminum alloy, or the like, which is stable within the potential range of the positive electrode 4, a film having the metal disposed in a surface layer, or the like. Each of the positive electrode mixture layers 41 contains a positive electrode active material, a conductive material, and a binder. The positive electrode 4 can be produced by applying a positive electrode mixture slurry, containing the positive electrode active material, the conductive material, the binder, the dispersion medium, etc., on the positive electrode core 40, removing the dispersion medium by drying the coating films, and then compressing the coating films to form the positive electrode mixture layers 41 on both surfaces of the positive electrode core 40.

The positive electrode active material is composed of a lithium transition metal composite oxide as a main component. Examples of the metal element contained in the lithium transition metal composite oxide include Ni, Co, Mn, Al, B, Mg, Ti, V, Cr, Fe, Cu, Zn, Ga, Sr, Zr, Nb, In, Sn, Ta, W, and the like. A preferred example of the lithium transition metal composite oxide is a composite oxide containing at least one of Ni, Co, and Mn. In addition, inorganic compound particles of aluminum oxide, a lanthanide-containing compound, or the like may be fixed to the particle surfaces of the lithium transition metal composite oxide.

Examples of the conductive material contained in the positive electrode mixture layers 41 include carbon materials such as carbon black, acetylene black, Ketjen black, graphite, and the like. Examples of the binder contained in the positive electrode mixture layers 41 include fluorocarbon resins such as polytetrafluoroethylene (PTFE), polyvinylidene fluoride (PVdF), and the like; polyacrylonitrile (PAN), polyimide, acrylic resins, polyolefin, and the like. Any one of these resins may be used in combination with a cellulose derivative such as carboxymethyl cellulose (CMC) or a salt thereof, polyethylene oxide (PEO), or the like.

[Negative Electrode]

As described above, the negative electrode 5 includes a negative electrode core 50 and negative electrode mixture layers 51 formed on both surfaces of the negative electrode core 50. The negative electrode core 50 can be formed by using a metal foil of copper, a copper alloy, or the like, which is stable within the potential range of the negative electrode 5, a film having the metal disposed in a surface layer, or the like. The thickness of the negative electrode core 50 is, for example, 5 μm or more and 20 μm or less. Each of the negative electrode mixture layers 51 contains a negative electrode active material and a binder. The thickness of the negative electrode mixture layer 51 on each of the sides of the negative electrode core 50 is, for example, 50 μm or more and 150 μm or less and preferably 80 μm or more and 120 μm or less. The negative electrode 5 can be produced by applying a negative electrode mixture slurry, containing the negative electrode active material and the binder on the negative electrode core 50, removing the dispersion medium by drying the coating films, and then compressing the coating films to form the negative electrode mixture layers 51 on both surfaces of the negative electrode core 50.

Each of the negative electrode mixture layers 51 contains, as the negative electrode active material, for example, a carbon-based active material which reversibly absorbs and desorbs lithium ions. Preferred examples of the carbon-based active material include natural graphite such as flake graphite, bulk graphite, earthy graphite, and the like, artificial graphite such as massive artificial graphite (MAG), graphitized mesophase carbon microbeads (MCMB), and the like, and the like. Also, a Si-based active material composed of at least one of Si and a Si-containing compound may be used as the negative electrode active material, and a carbon-based active material and a Si-based active material may be used in combination.

Like in the positive electrode 4, examples which may be used as the binder contained in the negative electrode mixture layers 51 include fluorocarbon resins such as PTFE, PVdF, and the like; PAN, polyimide, acrylic resins, polyolefin, and the like. However, styrene-butadiene rubber (SBR) is preferably used. Also, each of the negative electrode mixture layers 51 may contain CMC or a salt thereof polyacrylic acid (PAA) or a salt thereof, PVA or the like. CMC or a salt thereof functions as a thickener for adjusting the negative electrode mixture slurry within a proper viscosity range and also, like SBR, it functions as a binder.

A preferred example of the negative electrode mixture layers 51 contains the negative electrode active material having a volume-based median diameter of 8 μm or more and 1 2 μm or less, SBR, and CMC or a salt thereof. The volume-based median diameter is the particle diameter at a cumulative volume value of 50% in the particle size distribution measured by a laser diffraction scattering method and is also referred to as the "50% particle diameter (D50)" or "median diameter". The packing density of each of the negative electrode mixture layers 51 is mainly determined by the packing density of the negative electrode active material, and the packing density is greatly influenced by the D50, particle size distribution, shape, etc. of the negative electrode active material. The content of each of SBR and CMC or a salt thereof is preferably 0.1% by mass or more and 5% by mass or less and more preferably 0.5% by mass or more and 3% by mass or less relative to the mass of each of the negative electrode mixture layers 51.

Each of the negative electrode mixture layers 51 has a first region 51A located in the flat part 20 of the electrode body 3 and second regions 51B located in the pair of curved parts 21, and the ratio (B/A) of the packing density (B) in each of the second regions 51B to the packing density (A) in the first region 51A is 0.75 or more and 0.95 or less. In other words, the packing density of each of the negative electrode mixture layers 51 in the curved parts 21 of the electrode body 3 is 0.75 times or more and 0.95 times or less the packing density in the flat part 20. With the packing density ratio (B/A) out of the range described above, as described in examples and comparative examples later, the good cycle characteristics cannot be secured. The packing density ratio (B/A) is more preferably 0.78 or more and 0.93 or less and particularly preferably 0.80 or more and 0.92 or less.

The porosity of the first region 51A is preferably 38% or more and 48% or less and more preferably 40% or more and 46% or less. The porosity of the second regions 51B is preferably 48% or more and 59% or less and more preferably 50% S or more and 57% or less. Within the range, the cycle characteristics are more effectively improved.

The second regions 51B (curved parts 21) having a low packing density in the negative electrode mixture layers 51 have good retention of the nonaqueous electrolyte as compared with the first region 51A (flat part 20) having a high packing density. With the packing density ratio (B/A) of 0.75 or more and 0.95 or less, the nonaqueous electrolyte pushed out from the flat part 20 can be efficiently stocked in the curved parts 21, and when the volume of the flat part 20 is contracted, the electrolyte stocked in the curved parts 21 is rapidly returned to the flat part 20. This can suppress the lack of the electrolyte in the flat part 20 and a decrease in the cycle characteristics caused thereof.

The packing densities (A and B) in the first region 51A and the second regions 51B are not particularly limited as long as the packing density ratio (B/A) is satisfied, but from the viewpoint of battery capacity or the like, both the packing densities are preferably 0.9 g/cm$^3$ or more and more preferably 1.0 g/cm$^3$ or more. The packing density (A) in the first region 51A is, for example, 1.15 g/cm$^3$ or more and 1.35 g/cm$^3$ or less or 1.20 g/cm$^3$ or more and 1.30 g/cm$^3$ or less. The packing density (B) in the second regions 51B is, for example, 0.95 g/cm$^3$ or more and 1.15 g/cm$^3$ or less or 1.00 g/cm$^3$ or more and 1.10 g/cm$^3$ or less.

The packing density (A) in the first region 51A is preferably substantially uniform over the whole of the first region 51A. Similarly, the packing density (B) in the second regions 51B is preferably substantially uniform over the whole of the second regions 51B. However, a portion with a lower or higher packing density than the other portions may be present in the first region 51A (the same applies to the second regions 51). The packing densities (A and B) are determined by measuring the mass of each of the negative electrode mixture layers 51 per unit area of the negative electrode core 50 and the thickness of each of the negative electrode mixture layers 51 and dividing the mass by the thickness.

The packing density ratio (B/A) can be controlled within the range of 0.75 or more and 0.95 or less by the pressing conditions for molding a wound body, which contains the positive electrode 4, the negative electrode 5, and the separator 30, into a flat shape. Specifically, the packing density ratio (B/A) can be controlled by properly changing the pressing temperature, the pressing pressure, or the pressing time. The packing density ratio (B/A) can also be controlled by differentiating the amount of the negative electrode mixture slurry applied on the negative electrode core 50 in a portion serving as the first region 51A and the amount in a portion serving as each of the second regions 51B. However, from the viewpoint of productivity or the like, the packing density ratio (B/A) is preferably controlled by forming the negative electrode mixture layers 51 having a substantially uniform packing density and then changing the pressing conditions. Also, the sectional area ratio (SB/SA) can be controlled by the pressing conditions.

An example of the pressing temperature is 60° C. or more and 90° C. or less or 70° C. or more and 80° C. or less. An example of the pressing time is 5 minutes or more, 15 minutes or more, or 30 minutes or more. The upper limit of the pressing time is not particularly limited but is preferably 60 minutes or less from the viewpoint of productivity or the like. Under the same conditions of pressing temperature and pressing time, increasing the pressing pressure increases the packing density (A) in the first region 51A and thus easily decreases the packing density ratio (B/A). On the other hand, decreasing the pressing pressure decreases the packing density (A) in the first region 51A and thus easily increases the packing density ratio (B/A). An example of the pressing pressure is 90 kN or more and 115 kN or less. Also, increasing the pressing pressure decreases the sectional area ratio (SB/SA), and decreasing the pressing pressure easily increases the sectional are ratio (SB/SA).

[Separator]

A porous sheet having ion permeability and insulation is used as the separator 30. Examples of the separator 30 (porous sheet) include porous substrates each containing, as a main component, at least one selected from polyolefin, polyvinylidene fluoride, polytetrafluoroethylene, polyimide, polyamide, polyamide-imide, polyethersulfone, polyetherimide, and aramid. In particular, polyolefin is preferred, and polyethylene and polypropylene are particularly preferred.

The separator 30 may be composed of only a resin-made porous substrate or may have a multilayer structure in which a heat-resistant layer or the like containing inorganic particles is formed on at least one of the surfaces of the porous substrate. Also, the resin-made porous substrate may have a multilayer structure of polypropylene/polyethylene/polypropylene or the like. The thickness of the separator 30 is, for example, 10 μm or more and 30 μm or less. The separator 30 has, for example, an average pore diameter of 0.02 μm or more and 5 μm or less and a porosity of 30% or more 70% or less. The electrode body 3 generally contains two separators 30, which may be the same.

The separator 30 has a first region located in the flat part 20 of the electrode body 3 and second regions located in the pair of curved parts 21, and the ratio (D/C) of the air permeability (D) in the second regions to the air permeability (C) in the first region may be 0.5 or more and 0.9 or less. In other words, the air permeability of the separator 30 in each of the curved parts 21 of the electrode body 3 may be 0.5 times or more and 0.9 times or less the air permeability in the flat part 20. With the air permeability ratio (D/C) within the range, the retention of the nonaqueous electrolyte in the curved parts 21 is further improved, and an attempt can be made to further improve the cycle characteristics. The air permeability ratio (D/C) is more preferably 0.52 or more and 0.86 or less and particularly preferably 0.6 or more and 0.8 or less. The air permeability (s/100 cc) of the separator 30 can be measured by using an air permeability measurement device (manufactured by Kumagai Riki Kogyo Co., Ltd., Oken-type smoothness and air permeability tester: product No. 2040-C).

The air permeability (C) in the first region of the separator 30 is not particularly limited as long as the air permeability ratio (D/C) is satisfied, but is preferably 250 s/100 cc or more and 450 s/100 cc or less. Similarly, the air permeability (D) in the second regions of the separator 30 is not particularly limited as long as the air permeability ratio (D/C) is satisfied, but is preferably 150 s/100 cc or more and 250 s/100 cc or less. With the air permeabilities (C and D) within the respective ranges described above, an attempt can be made to improve the cycle characteristics while maintaining the good output characteristics and insulation.

EXAMPLES

The present disclosure is described in further detail below by examples, but the present disclosure is not limited to these examples.

Example 1

[Formation of Positive Electrode]

A lithium transition metal composite oxide represented by $LiNi_{0.35}Co_{0.35}Mn_{0.30}O_2$ was used as a positive electrode active material. The positive electrode active material, acetylene black, and polyvinylidene fluoride (PVdF) were mixed at a solid content mass ratio of 97:2:1 to prepare a positive electrode mixture slurry using N-methyl-2-pyrrolidone (NMP) as a dispersion medium. Next, the positive electrode mixture slurry was applied on both surfaces of a positive electrode core composed of a strip-shaped aluminum foil having a width of 127 mm (coating width 110 mm=length (K) of a positive electrode mixture layer along the axial direction of an electrode body), and the coating films were dried and then compressed to form positive electrode mixture layers on both surfaces of the core. The core was cut into a predetermined electrode size to form a positive electrode.

[Formation of Negative Electrode]

Graphite was used as a negative electrode active material. The negative electrode active material, a CMC sodium salt, and a SBR dispersion were mixed at a solid content mass ratio of 98.7:0.7:0.6 to prepare a negative electrode mixture slurry using water as a dispersion medium. Next, the negative electrode mixture slurry was applied on both surfaces of a negative electrode core composed of a strip-shaped copper foil having a width of 130 mm (coating width: 115 mm), and the coating films were dries and then compressed to form, on both surfaces of the core, negative electrode mixture layers each having a packing density of 1.07 $g/cm^3$. The core was cut into a predetermined electrode size to form a negative electrode.

[Formation of Electrode Body]

The positive electrode and the negative electrode were wound through a strip-shaped separator having a width of 120 mm, and then the wound body was formed into a flat shape by pressing in the radial direction, thereby forming a wound electrode body. The wound body was formed by superposing the positive electrode, the negative electrode, and the separator in the order of separator/positive electrode/separator/negative electrode, and winding on a cylindrical winding core (the two separators used were the same). Also, the positive electrode and the negative electrode were wound so that the core exposed portions of the positive electrode and the negative electrode were positioned opposite to each other in the axial direction of the wound body. The pressing conditions for the wound body included a pressing temperature of 75° C., a pressing pressure of 100 kN, and a pressing time of 30 minutes. By using the same method, three electrode bodies were formed. As a result of measurement of the thickness of each of the electrode bodies at the center in the axial direction and the width direction, the average thickness (d) was 15.7 mm. In addition, the electrode body had a length of 144 mm in the axial direction, a width (W) of 57.1 mm, and an aspect ratio (K/W) of 1.93.

[Preparation of Nonaqueous Electrolyte]

$LiPF_6$ was added so that its concentration was 1 mol/L in a mixed solvent prepared by mixing ethylene carbonate (EC), ethylmethyl carbonate (EMC), and diethyl carbonate (DEC) at a volume ratio of 3:3:4 (25° C., 1 atm), and further vinylene carbonate was added so that its concentration was 0.3% by mass, preparing a nonaqueous electrolyte.

[Formation of Nonaqueous Electrolyte Secondary Battery]

A nonaqueous electrolyte secondary battery (prismatic battery) was formed by using the electrode body, the nonaqueous electrolyte, and a prismatic battery case. A positive electrode terminal was attached to a sealing plate constituting the battery case, and a positive electrode current collector was connected to the positive electrode terminal. Also, a negative electrode terminal was attached to the sealing plate, and a negative electrode current collector was connected to the negative electrode terminal. Then, the positive electrode current collector and the negative electrode current collector were welded to the core exposed portion of the positive electrode and the core exposed portion of the negative electrode, respectively. The electrode body integrated with the sealing plate was housed, in the state of being disposed in an insulating sheet formed in a box shape, inside a prismatic bottomed cylindrical outer case (length in the lateral direction: 148.0 mm (inner dimension: 146.8 mm), thickness: 17.5 mm (inner dimension: 16.5 mm), height: 65.0 mm (inner dimension: 64.0 mm)), and an opening of the outer case was sealed with the sealing plate. Then, 65 g of the nonaqueous electrolyte was injected from an electrolyte injection hole of the sealing plate, and then after the electrode body was sufficiently immersed in the nonaqueous electrolyte, pseudo-charging was performed. Then, a sealing plug was attached to the injection hole to form a nonaqueous electrolyte secondary battery (battery capacity: 8 Ah).

Example 2

An electrode body and a nonaqueous electrolyte secondary battery were formed by the same methods as in Example 1 except that in forming the electrode body, the negative electrode used included a negative electrode mixture layer having a packing density of 1.01 g/cm$^3$ before pressing a wound body, and the pressing pressure for the wound body was changed to 115 kN. The electrode body had a thickness 15.2 mm and a width (W) of 57.5 mm.

Example 3

An electrode body and a nonaqueous electrolyte secondary battery were formed by the same methods as in Example 1 except that in forming the electrode body, the negative electrode used included a negative electrode mixture layer having a packing density of 1.11 g/cm$^3$ before pressing a wound body, and the pressing pressure for the wound body was changed to 90 kN. The electrode body had a thickness 16.4 mm and a width (W) of 56.9 mm.

Comparative Example 1

An electrode body and a nonaqueous electrolyte secondary battery were formed by the same methods as in Example 1 except that in forming the electrode body, the negative electrode used included a negative electrode mixture layer having a packing density of 1.01 g/cm$^3$ before pressing a wound body, and the pressing pressure for the wound body was changed to 110 kN. The electrode body had a thickness 15.8 mm and a width (W) of 57.5 mm.

Comparative Example 2

An electrode body and a nonaqueous electrolyte secondary battery were formed by the same methods as in Example 1 except that in forming the electrode body, the pressing pressure for a wound body was changed to 122 kN. The electrode body had a thickness 14.8 mm and a width (W) of 57.1 mm.

Comparative Example 3

An electrode body and a nonaqueous electrolyte secondary battery were formed by the same methods as in Comparative Example 1 except that in forming the electrode body, the pressing pressure for a wound body was changed to 89 kN. The electrode body had a thickness 16.7 mm and a width (W) of 57.1 mm.

Comparative Example 4

An electrode body and a nonaqueous electrolyte secondary battery were formed by the same methods as in Example 1 except that in forming the electrode body, the negative electrode used included a negative electrode mixture layer having a packing density of 1.13 g/cm$^3$ before pressing a wound body, and the pressing pressure for the wound body was changed to 106 kN. The electrode body had a thickness 15.7 mm and a width (W) of 56.7 mm.

Comparative Example 5

An electrode body and a nonaqueous electrolyte secondary battery were formed by the same methods as in Comparative Example 1 except that in forming the electrode body, the pressing pressure for a wound body was changed to 122 kN. The electrode body had a thickness 14.8 mm and a width (W) of 57.5 mm.

[Packing Densities (A and B) of Negative Electrode Mixture Layer]

Each of the batteries of the examples and the comparative examples was disassembled, and the thickness of the negative electrode was measured in the flat part and the curved parts of the electrode body by using a micrometer. In this case, the thickness of the negative electrode in the flat part was measured, at the center in the longitudinal direction and the width direction of the flat part, in the second layer inward from the outermost periphery of the negative electrode nearest to the outer peripheral surface of the electrode body. Similarly, the thickness of the negative electrode in each of the curved parts was measured in the second layer inward from the outermost periphery of the negative electrode. Each of the packing densities (A and B) of the negative electrode mixture layers in the flat part and in the curved parts was determined by the formula below. The determined packing densities (A and B) and the packing density ratio (B/A) are shown in Table 1.

(Packing density)=(mass of negative electrode mixture layer per unit area)÷(negative electrode thickness−core thickness)

[Sectional Areas SA and SB]

With respect to each of the disassembled batteries of the examples and the comparative examples, the sectional areas were calculated by using the thickness (d) and width (W) of the electrode body according to formulae below. The determined sectional area ratios (SB/SA) are shown in Table 1.

$SA = d \times (W-d)$ $SB = ((d/2) \times (d/2)) \times \pi$

[Evaluation of Capacity Retention Rate]

Each of the batteries of the examples and the comparative examples was charged at 25° C. and a constant current of 8.0 A until the battery voltage was 4.1 V, and then discharged at a constant current of 8.0 A until the battery voltage was 2.5 V. This charge-discharge cycle was repeated 100 cycles, and the ratio (capacity retention rate) of the discharging capacity at the 100th cycle to the discharging capacity at the 1st cycle was determined. In Table 1, the capacity retention rate of each of the batteries is shown as a relative value assuming that the capacity retention rate of the battery of Example 1 is 100.

[Evaluation of Output]

Each of the batteries after 100 cycles was charged under the condition of 25° C. until the state of charge (SOC) of the battery was 50%. Next, the battery was discharged at 25° C. for 10 seconds at a current value of each of 60 A, 120 A, 180 A, and 240 A to measure the battery voltage. Then, a current value at 3.0 V was calculated from the linear line obtained by plotting the current values and the battery voltages, and the output value was calculated. The state of charge deviated by discharge was returned to the initial state of charge by charging at a constant current of 8.0 A. In Table 1, the output value of each of the batteries is shown as a relative value assuming that the output of the battery of Example 1 is 100.

[Evaluation of Lithium Precipitation]

Each of the batteries after the cycle test was disassembled, and the presence of Li precipitation was evaluated by visually observing the surface of the negative electrode. Table 1 shows the evaluation results as follows: The case where Li precipitation was not confirmed over the entire length of the negative electrode was evaluated as "good", and the case where Li precipitation was confirmed was evaluated as "bad".

TABLE 1

|  | Packing density of negative electrode mixture layer | | | | Cycle test | | |
| --- | --- | --- | --- | --- | --- | --- | --- |
|  | Flat part A [g/cm³] | Curved part B [g/cm³] | Packing density ratio B/A | Sectional area ratio SB/SA | Capacity retention rate | Output | Li precipitation |
| Example 1 | 1.29 | 1.07 | 0.83 | 0.298 | 100 | 100 | Good |
| Example 2 | 1.30 | 1.01 | 0.78 | 0.282 | 97 | 101 | Good |
| Example 3 | 1.20 | 1.11 | 0.93 | 0.318 | 101 | 95 | Good |
| Comparative Example 1 | 1.45 | 1.01 | 0.70 | 0.298 | 90 | 92 | Bad |
| Comparative Example 2 | 1.29 | 1.07 | 0.83 | 0.275 | 86 | 88 | Bad |
| Comparative Example 3 | 1.29 | 1.01 | 0.83 | 0.325 | 97 | 89 | Good |
| Comparative Example 4 | 1.15 | 1.13 | 0.98 | 0.301 | 88 | 88 | Bad |
| Comparative Example 5 | 1.45 | 1.01 | 0.70 | 0.272 | 82 | 85 | Bad |

As understood from the evaluation results shown in Table 1, all batteries of the examples have excellent cycle characteristics as compared with the batteries of the comparative examples. The batteries of the examples show a high capacity retention rate and output after the cycle test. Also, Li precipitation is not confirmed on the surfaces of the negative electrodes of the batteries of the examples. On the other hand, the batteries of the comparative examples show low capacity retention rate and/or output after the cycle test, and Li precipitation is also confirmed on the surfaces of the negative electrodes excluding the battery of Comparative Example 3.

The battery of Comparative Example 1 shows the sectional area ratio (SB/SA) equal to that of the battery of Example 1, but the packing density ratio (B/A) of the packing density (B) of the negative electrode mixture layers in the curved parts to the pacing density (A) in the flat part is as low as 0.70. That is, the packing density of the negative electrode mixture layers in the flat part is considered to be relatively increased, thereby decreasing the push-out and return of the electrolyte to the curved parts when a change in volume of the electrode body occurs associated with charge/discharge. This result is considered to cause the lack or depletion of the electrolyte in the flat part and thus cause decreases in the capacity retention rate and output and Li precipitation on the surface of the negative electrode. In the comparative examples excluding Comparative Example 3, Li precipitation is confirmed in the flat part over the entire length of the negative electrode. In particular, precipitation is remarkable at the center, which has a large volume change, in the axial direction and the width direction of the electrode body.

The battery of Comparative Example 2 shows the packing density ratio (B/A) equal to that of the battery of Example 1, but the sectional area ratio (SB/SA) is as low as 0.275. In this case, the amount of the electrolyte which can be stocked in the curved parts is decreased, thereby causing the lack or depletion of the electrolyte in the flat part. Therefore, it is considered that in the cycle test, the capacity retention rate and output are decreased and Li precipitation occurs on the surface of the negative electrode.

The battery of Comparative Example 3 shows the packing density ratio (B/A) equal to that of the battery of Example 1, but the sectional area ratio (SB/SA) is as high as 0.325. In this case, the electrolyte is sufficiently stocked in the curved parts, resulting in a good capacity retention rate and confirmation of no Li precipitation on the surface of the negative electrode after the cycle test. On the other hand, the electrode distance between the positive electrode and the negative electrode in the curved parts is longer than that in the flat part, and thus resistance tends to be increased in relation to the ionic conductivity in the electrolyte. In the battery of Comparative Example 3, the output is considered to be decreased due to the large curved parts.

The battery of Comparative Example 4 shows the sectional area ratio (SB/SA) equal to that of the battery of Example 1, but the packing density ratio (B/A) is as high as 0.98. That is, the relatively low packing density in the flat part causes an increase in amount of the electrolyte pushed out in the winding axis direction of the electrode body and in the direction perpendicular thereto when the electrode body is expanded/contracted associated with charge/discharge. In this case, the function of stocking the electrolyte in the curved parts is not satisfactorily exhibited, leading to the lack or depletion of the electrolyte in the flat part. Therefore, it is considered that in the cycle test, the capacity retention rate and output are decreased, and Li precipitation occurs on the surface of the negative electrode.

Also, the battery of Comparative Example 5 causes the lack or depletion of the electrolyte in the flat part. Thus, it is considered that the capacity retention rate and output are decreased, and Li precipitation occurs on the surface of the negative electrode.

Example 4

An electrode body and a nonaqueous electrolyte secondary battery (battery capacity: 6.5 Ah) were formed by the same methods as in Example 1 except that in forming the electrode body, the coating width of a positive electrode mixture slurry was changed to 92.0 mm, the coating width of a negative electrode mixture slurry was changed to 94.1 mm, and the aspect ratio (K/W) was changed to 1.61. Precipitation of Li was not confirmed on the surface of the negative electrode.

Example 5

An electrode body and a nonaqueous electrolyte secondary battery (battery capacity: 5.8 Ah) were formed by the same methods as in Example 1 except that in forming the electrode body, the coating width of a positive electrode mixture slurry was changed to 85.0 mm, the coating width of a negative electrode mixture slurry was changed to 83.6 mm, and the aspect ratio (K/W) was changed to 1.49. Precipitation of Li was not confirmed on the surface of the negative electrode.

TABLE 2

| | Packing density ratio B/A | Sectional area ratio SB/SA | Aspect ratio K/W | Cycle test Capacity retention rate | Output | Li precipitation |
|---|---|---|---|---|---|---|
| Example 1 | 0.83 | 0.298 | 1.93 | 100 | 100 | Good |
| Example 4 | 0.83 | 0.298 | 1.61 | 98 | 99 | Good |
| Example 5 | 0.83 | 0.298 | 1.49 | 94 | 96 | Good |

Table 2 indicates that the battery of Example 5 has the packing density ratio (B/A) and sectional area ratio (SB/SA) equivalent to those of the batteries of Examples 1 and 4 and the aspect ratio (K/W) lower than those of the batteries of Examples 1 and 4. That is, it is considered that in Example 5, the flat part has a relatively short length in the axial direction and thus, when the electrode body is expanded associated with charge, the electrolyte is easily pushed out to both sides in the axial direction of the electrode body beyond the formation region of the positive electrode mixture layers. Therefore, it is considered that the electrolyte pushed out from the electrode body is hardly returned to the central part of the electrode body, and thus the cycle characteristics are slightly decreased.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A nonaqueous electrolyte secondary battery comprising:
    a wound electrode body which is obtained by winding a positive electrode, containing a positive electrode mixture layer, and a negative electrode containing a negative electrode mixture layer, and a separator interposed between the positive electrode and the negative electrode, and which is formed into a flat shape having a flat part and a pair of curved parts;
    a nonaqueous electrolyte; and
    a battery case which houses the electrode body and the nonaqueous electrolyte,
    wherein the negative electrode mixture layer contains a first region located in the flat part of the electrode body and second regions located in the pair of curved parts, the ratio B/A of the packing density B in each of the second regions to the packing density A in the first region being 0.75 or more and 0.95 or less: and
    in a section passing through the center in the axial direction of the electrode body and being perpendicular to the axial direction, the ratio SB/SA of the cross-sectional area SB of the pair of curved parts to the cross-sectional area SA of the flat part is 0.28 or more and 0.32 or less, wherein SA is equal to $d \times (W-d)$, and SB is equal to $(d/2)^2 \pi$ where d represents a thickness of the wound electrode body and W represents a width in the direction perpendicular to the axial direction and the thickness direction of the wound electrode body.

2. The nonaqueous electrolyte secondary battery according to claim 1,
    wherein the ratio K/W of the length K of the positive electrode mixture layer along the axial direction of the electrode body to the width W in the direction perpendicular to the axial direction and the thickness direction of the electrode body is 1.6 or more.

3. The nonaqueous electrolyte secondary battery according to claim 1,
    wherein the ratio B/A is 0.78 or more and 0.93 or less.

4. The nonaqueous electrolyte secondary battery according to claim 1,
    wherein the porosity of the first region is 38% or more and 48% or less; and
    the porosity of the second regions is 48% or more and 59% or less.

5. The nonaqueous electrolyte secondary battery according to claim 1,
    wherein the negative electrode mixture layer contains particles of a negative electrode active material having a volume-based median diameter of 8 µm or more and 12 µm or less, and wherein the negative electrode mixture layer further contains styrene-butadiene rubber, and carboxymethyl cellulose or a salt thereof.

6. The nonaqueous electrolyte secondary battery according to claim 1,
    wherein the battery case houses the nonaqueous electrolyte in an amount of 55 g or more and 75 g or less.

* * * * *